(12) United States Patent
Kim et al.

(10) Patent No.: US 6,679,985 B2
(45) Date of Patent: Jan. 20, 2004

(54) ELECTROCHEMICAL DISCHARGE MACHINING DEVICE AND MACHINING METHOD

(76) Inventors: Soo Hyun Kim, 122-1102 Hanbit Apt., Eoeun-dong, Yusong-gu, Taejon 305-333 (KR); Young-Mo Lim, E-103 Hyanglin Villa, Dongbaek-ri, Kusong-myeon, Yongin 449-910 (KR); Hyung-Jun Lim, Na-403, Sowon 1 cha Apt., Sugok-dong, Heungduk-gu, Chongju 361-150, Choongchongbuk-do (KR)

( * ) Notice: Subject to any disclaimer, the term of this patent is extended or adjusted under 35 U.S.C. 154(b) by 180 days.

(21) Appl. No.: 10/047,785

(22) Filed: Jan. 14, 2002

(65) Prior Publication Data
US 2002/0170829 A1 Nov. 21, 2002

(30) Foreign Application Priority Data
May 15, 2001 (KR) .......................................... 2001-26352

(51) Int. Cl.[7] .............................. B23H 5/00; B23H 7/14; C25D 17/00; C25F 7/00; C25B 11/04
(52) U.S. Cl. .................. 205/658; 204/224 M; 204/225; 204/230.5; 204/275.1; 204/292; 205/674
(58) Field of Search ............................ 204/224 M, 225, 204/230.2, 230.5, 292, 275.1; 205/658, 659, 674

(56) References Cited

U.S. PATENT DOCUMENTS

| | | | | |
|---|---|---|---|---|
| 2,300,855 A | * | 11/1942 | Allen et al. ............... | 125/30.02 |
| 3,385,947 A | * | 5/1968 | Inoue ....................... | 219/69.17 |
| 3,417,006 A | * | 12/1968 | Inoue ......................... | 205/641 |
| 3,594,299 A | * | 7/1971 | Inoue ..................... | 204/224 M |

* cited by examiner

Primary Examiner—Patrick Ryan
Assistant Examiner—Thomas H. Parsons
(74) Attorney, Agent, or Firm—Allen,Dyer, Doppelt, Milbrath & Gilchrist, P.A.

(57) ABSTRACT

An electrochemical discharge machining method may include electrolytically machining a tool fed by a three-dimensional tool feeder which can accurately feed a tool in three dimensions. The electrolytic machining may be performed in a current controlled mode, during which a concentration and a height of an electrolyte may be regulated. Further, the method may include performing electrochemical discharge machining of the workpiece using the machined tool in a voltage controlled mode.

19 Claims, 3 Drawing Sheets

ELECTROCHEMICAL DISCHARGE MACHINING DEVICE AND MACHINING METHOD

FIELD OF THE INVENTION

The present invention relates to mechanical machining techniques, and more particularly, to an electrochemical discharge machining device capable of performing a discharge machining as well as an electrolytic machining in the same device, and a machining method. More specifically, the present invention relates to an electrochemical discharge machining device and a machining method for performing an electrolytic machining of a tool fed by a three-dimensional tool feeder which can accurately feed a tool in three dimensions in a current controlled mode, regulate a concentration and a height of an electrolyte, and perform an electrochemical discharge machining of a workpiece using the machined tool in a voltage controlled mode.

BACKGROUND OF THE INVENTION

Traditional mechanical machining techniques for machining workpieces have included physical processes involving a lathe or milling. However, to perform machining of precision parts or easily breakable materials of high hardness, various machining devices and methods have been devised. Machining techniques which can perform machining using electrical and chemical principles include electrolytic machining and a discharge machining.

As for electrolytic machining, when a current is applied to the workpiece (which serves as an anode) immersed in an alkaline electrolyte and a tool (which serves as a cathode), the workpiece can be machined through the generated electrical and chemical reactions. Electrolytic polishing and electrolytic grinding are examples of such processes.

The workpiece is slowly dissolved in the electrolyte through an oxidation reaction. As such, by adjusting an applied current density, the extent and rate of dissolving may be controlled. Such electrolytic machining can be easily performed for metal materials with low carbon contents. Thus, heat resistant steel, cemented carbide, and high-tensile steel, which are difficult to machine by physical processes because of their higher strength and lower carbon contents as compared with an iron metal material, can be machined.

On the other hand, high hardness non-metallic materials have been conventionally machined using diamond powder. Yet, this method requires a long time period for machining, as well as the use of expensive diamond powder.

Alternatively, to machine such materials a discharge machining process has been developed. In discharge machining a negative voltage is applied to the workpiece and a positive voltage is applied to the tool. Then, when two materials are brought together at distance of a few of $\mu$m, sparking (i.e., dielectric breakdown) occurs. This event is referred to as discharge, which is used for machining the workpiece.

Conventional electrolytic machining and discharge machining are special machining techniques which use different methods and different devices. However, research to provide electrolytic machining and discharge machining in the same device has been carried out in recent years, which is commonly referred to as an electrochemical discharge machining.

A typical workpiece subjected to conventional electrochemical discharge machining would include a non-metallic material having high hardness, which is subjected to discharge machining as described above. The non-metallic high hardness materials are utilized in fields requiring high accuracy, such as aerospace, precious metal processing, and automobiles. In the conventional electrochemical discharge machining device, the tool is machined in a separate machining device, and then used for machining the non-metallic materials with high hardness.

In spite of developments improving the accuracy of machining, the workpiece often cannot be accurately machined due to frequent desorption of the tool. Further, such conventional electrochemical discharge machining processes developed for the unified process of electrolytic machining and discharge machining is disadvantageous in that the processes are complicated, and the tool is machined by a separate device.

SUMMARY OF THE INVENTION

Accordingly, it is an object of the present invention to alleviate the above noted problems and to provide an electrochemical discharge machining device that is capable of simultaneously performing an electrolytic machining and a discharge machining, thereby decreasing machining errors.

According to one aspect of the present invention an electrochemical discharge machining device may include a three-dimensional tool feeder or means, a position controller for electrically controlling movements of the three-dimensional tool feeder, and a tool fixed at a lower portion of the three-dimensional tool feeder. The device may also include an electrode having an opposite polarity to the tool, a power controller electrically connected to the position controller for applying a current to the tool and the electrode, and an electrolyte for promoting a certain electrochemical reaction between the tool and the electrode immersed therein. Furthermore, an electrolytic bath including the electrolyte in which a workpiece is processed may be included and may also include a jig by which the workpiece is upwardly positioned apart from a bottom of the bath.

More particularly, the electrolyte may be an aqueous alkaline solution selected from the group consisting of potassium hydroxide, magnesium hydroxide, sodium hydroxide, and calcium hydroxide. The tool may be made of a metal material including at least one of tungsten and copper. Additionally, the electrode may include at least one of platinum, silver and gold. Also, the workpiece may include at least one of glass, ceramic, quartz, diamond, ruby, and sapphire.

In addition, the electrolytic bath may include an exhaust valve for removing the electrolyte outside thereof, which may be at the bottom of one side of the bath, for example. The electrochemical discharge machining device may further include an electrolyte-supplying tank for supplying the electrolyte to the electrolytic bath. Moreover, the electrolyte-supplying tank may include a supply valve for regulating the flow of electrolyte to the electrolytic bath, which may be at a bottom side of the tank, for example.

A method aspect of the invention is for an electrochemical discharge machining method and may include supplying an electrolyte to an electrolytic bath at a predetermined height, immersing a tool at a length to be machined into the electrolyte, and electrolytically machining the tool by applying an electric field in a current controlled mode such that the tool and the electrode serve as an anode and a cathode, respectively. Furthermore, a concentration and a height of the electrolyte may be regulated based upon the material used for the workpiece, and an electric field may be applied in a voltage controlled mode so that the tool and the electrode serve as a cathode and an anode, respectively. Additionally, the tool may be fed to the workpiece to perform an electrochemical discharge machining.

Further, the electrolyte may be an aqueous alkaline solution selected from the group consisting of potassium hydroxide, magnesium hydroxide, sodium hydroxide, and calcium hydroxide. Also, the workpiece may include at least one of glass, ceramic, quartz, diamond, ruby, and sapphire. The tool may be made of a metal including at least one of tungsten and copper. Also, the electrode may be made of a material including at least one of platinum, silver and gold.

Further, the electrolytic bath may include an exhaust valve for removing the electrolyte to the outside thereof, for example, at the bottom of one side of the bath. Additionally, an electrolyte-supplying tank may be used for supplying the electrolyte to the electrolytic bath. The electroyte-supplying tank may be spaced apart from the bottom of the bath at a predetermined height and positioned over one side of the bath. Also, the electrolyte-supplying tank may include a supply valve for supplying the electrolyte to the electrolytic bath, e.g., at a bottom side of the tank.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
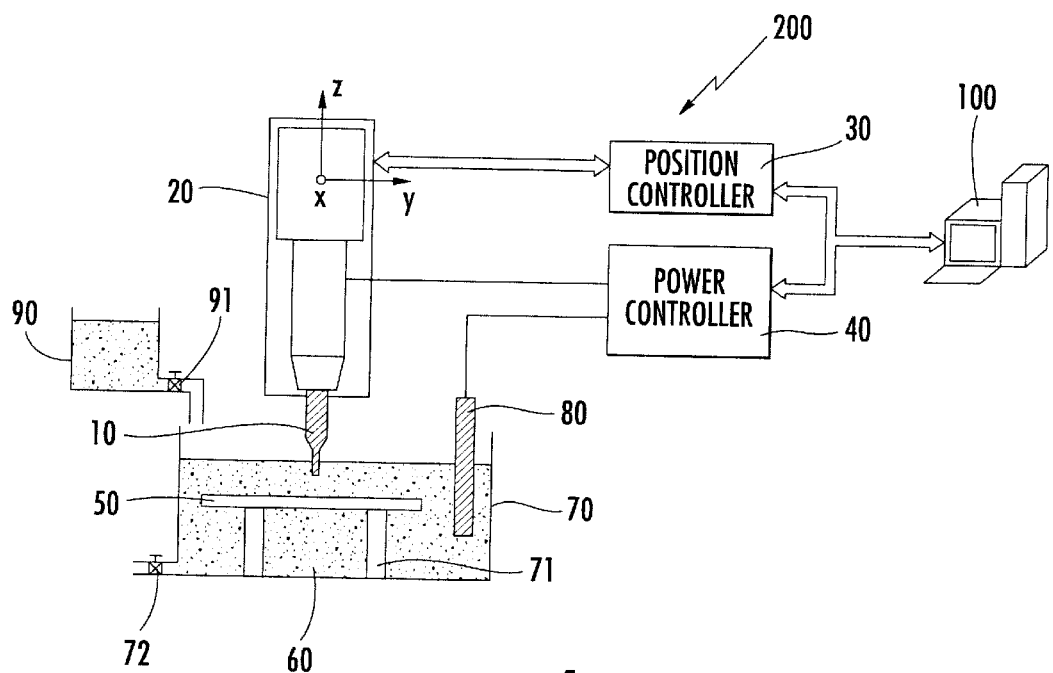
FIG. 1 is a schematic block diagram showing an electrochemical discharge machining device according to the present invention.
Figure 4:
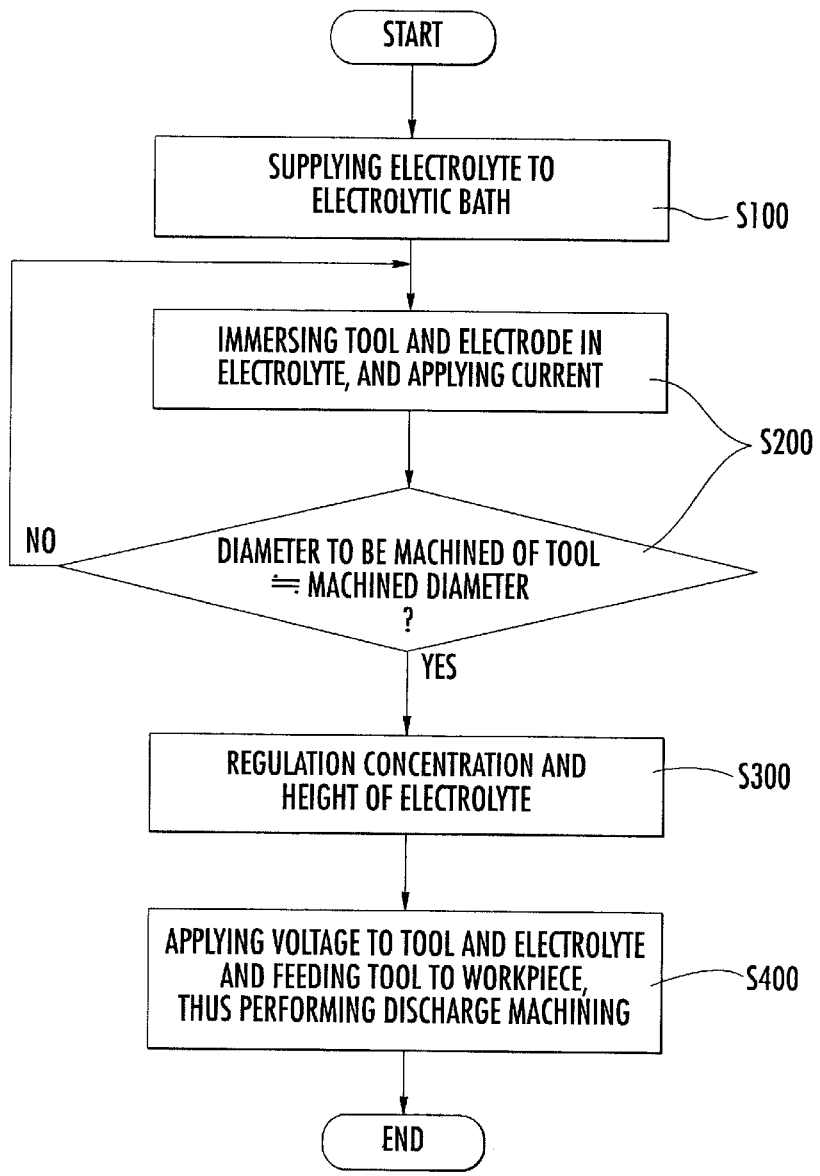
FIG. 4 is a flow chart of an electrochemical discharge machining process according to the present invention.

An electrochemical discharge machining device of the present invention is shown in the schematic block diagram of FIG. 1, and a machining method of the present invention is shown in the flow chart of FIG. 4. As seen in FIGS. 1 and 4, the electrochemical discharge machining device 200 includes a tool 10, an electrode 80 having an opposite polarity to the tool 10, a three-dimensional tool feeder or means 20 for feeding the tool 10 fixed at a lower portion of the means, a position controller 30 electrically connected to the three-dimensional tool feed means 20 for controlling movements of the means, and a power controller 40 electrically connected to the position controller 30 for supplying a direct current to the tool 10 and the electrode 80.

The machining device 200 further includes an electrolytic bath 70 for containing an electrolyte 60. The direct current applied tool 10 and the electrode 80 are immersed in the electrolyte 60 to cause a chemical reaction through which the tool 10 is electrochemically machined. Meanwhile, a workpiece 50, which is upwardly positioned apart from a bottom of the electrolytic bath 70 by a jig 71 and thus placed at the lower region of the bath, is subjected to electrochemical discharge machining by the tool 10.

At one bottom side of the electrolytic bath 70 an exhaust valve 72 is provided for removing the electrolyte 60 from the bath, and an electrolyte-supplying tank 90 is spaced apart from the bottom of the bath at a predetermined height and positioned over one side of the bath. The electrolyte-supplying tank 90 is provided for supplying the electrolyte 60 to the electrolytic bath 70. This may be done by controlling a supply valve 91 mounted on one side of the bottom of the tank, for example.

Further, the three-dimensional tool feed means 20 having the tool 10 fixed at its lower portion is responsible for immersing the tool 10 into the electrolyte 60 in the electrolytic bath 70, or for feeding the tool to a machining region of the workpiece 50. As such, the feed range of the tool is controlled through the electrically connected position controller 30.

The power controller 40 is electrically connected to the position controller 30 and controls the power supply used for machining. The power controller 40 also applies the direct current (or voltage) to the tool 10 and the electrode 80 to cause an electrolysis and an electrochemical discharge under current controlled mode or voltage controlled mode. All operations may be monitored through a computer 100 electrically connected to the position controller 30 and the power controller 40.

The tool 10 may be made of pure metal materials, such as tungsten or copper, for example, to facilitate the electrolysis and the electrochemical discharge in the electrolyte 60. Examples of the workpiece 50, which can be machined through electrochemical discharge of the tool 10, include very hard non-metallic materials, such as ceramics, glass, diamond, ruby, sapphire, etc. Ceramics are commonly used for a variety of applications and are readily available.

As for the electrolyte 60, it may be made of aqueous alkaline solutions including potassium hydroxide, sodium hydroxide, calcium hydroxide, and magnesium hydroxide, for example. Such an aqueous alkaline solution allows the current between the tool 10 and the electrode 80 to flow smoothly, thereby easily conducting the electrolysis and the electrochemical discharge.

The above described machining device 200 performs the electrochemical discharge machining as follows. A length of the tool 10 to be machined is fixed at the lower portion of the three-dimensional feed means 20, and a height of the workpiece is upwardly positioned apart from the bottom of the electrolytic bath by the jig 71. Subsequently, the electrolytic bath 70 is filled with the electrolyte 60 to a height higher than the length of the tool 10 to be machined.

As such, the electrolytic bath 70 is filled with the electrolyte 60 from the electrolyte-supplying tank 90, which is positioned to one side of the bath at the predetermined height from the bottom of the bath. Again, the electrolyte 60 can be supplied to the electrolytic bath 70 by opening the supply valve 91 of the electrolyte-supplying tank 90 (S100).

The tool 10 is immersed in the electrolyte 60 up to the length to be machined by controlling the three-dimensional tool feed means 20 via the position controller 30 to thereby electrochemically machine the tool 10. The electrode 80, which is laterally separated from the tool 10 at a predetermined distance, is immersed in the electrolyte 60 such that one side of the electrode 80 is electrically connected to the power controller 40 and its other side is immersed in the electrolyte.

The current controlled mode of the power controller 40 is maintained until the tool 10 has a desired diameter. The tool 10 serves as an anode and the electrode 80 serves as a cathode, and direct current is applied thereto. In such a condition, the tool 10, acting as an anode, undergoes an oxidation reaction in the electrolyte 60. As such, atoms of the tool 10 are ionized into the electrolyte 60. A more vigorous oxidation reaction occurs at a position near the end of the tool 10, which transforms the tool into a tipped rod.

If the applied current, i.e., current density, of the surface area of the tool 10 exposed to the electrolyte 60 (i.e., based upon the machining state of the tool 10) is held constant, the machined portion of the tool 10 has a uniform diameter. At the electrode 80 (i.e., the cathode), a reduction reaction which generates hydrogen gas occurs. As such, the tool 10 may be made of tungsten, and the electrode 80 may be made of platinum. Also, aqueous potassium hydroxide solution may be used as the electrolyte 60.

When the tool 10 is machined to a diameter of about 0.5 mm, the molar number of the electrolyte 60 is about 5 mol, and the applied current density ranges from about 10 to 12 mA/mm$^2$. The vertical position of the tool 10 is controlled in real-time using the three-dimensional tool feed means 20 so that the tool can be machined (S200). Thereafter, the height and the concentration of the electrolyte 60 are regulated based on the material of the workpiece 50 positioned in the electrolytic bath 70 (S300).

When the power controller 40 is switched from the current controlled mode to the voltage controlled mode, the polarities of the tool 10 and the electrode 80 are converted to a cathode and an anode, respectively, i.e., the polarities are reversed compared with those used for the electrolytic machining of the tool 10. Subsequently, a voltage is applied thereto. Further, the power controller 40 is controlled to apply a relatively higher voltage to the tool 10 and the electrode 80, as compared to the electrolytic machining of the tool 10.

When this happens, the tool 10 generates hydrogen gas due to the continuous voltage application of the power controller 40, and the electrode 80 is ionized through an oxidation reaction. However, the electrode may include materials which are not easily dissolved in the electrolyte 60, such as platinum, silver, gold, etc., so that its loss of mass is small.

Furthermore, when the voltage applied to the tool 10 exceeds a predetermined limit, sparks arise from the lower end of the tool 10 having the smallest radius of curvature, and the predetermined limit of the voltage is changed on the basis of concentration of the electrolyte 60, shape of the tool 10, and the area of the tool 10 in contact with the electrolyte 60. Furthermore, sparks occur even at the upper portion of the tool 10 as the voltage applied to the tool 10 is increased, and it begins as a common undercurrent and develops into corona discharge, spark discharge, and arc discharge.

By controlling the power controller 40 to maintain a constant voltage, sparks can be created only at the lower end of the tool 10. At that time, the tool 10 is perpendicularly and downwardly fed by the three-dimensional feed means 20 to come into contact with the surface of the workpiece 50, thereby electrochemically machining the workpiece 50. In addition, the workpiece 50 can be machined to a desired form by carrying out a horizontal feed as well as a perpendicular and downward feed of the tool 10 at the same time (S400).

Figure 2:
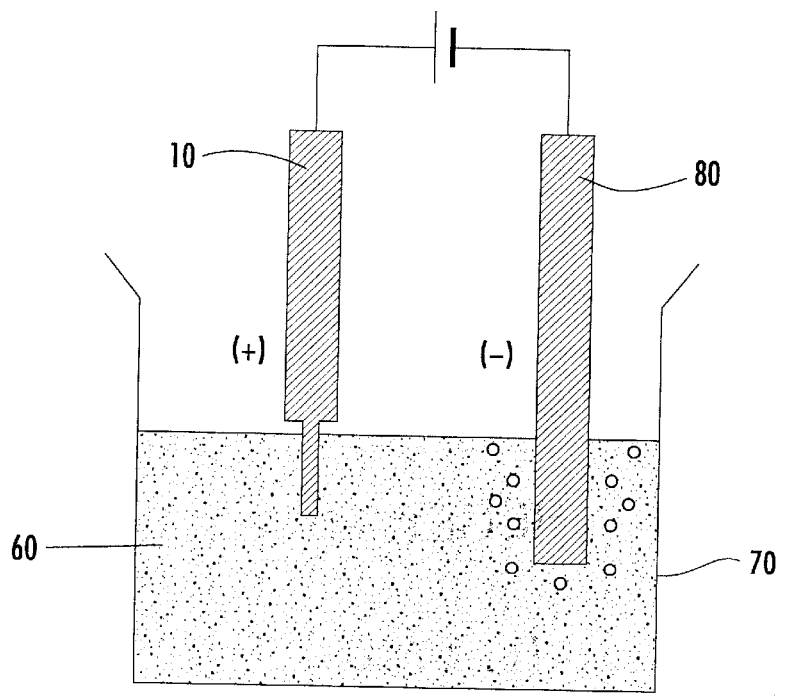
FIG. 2 is a schematic diagram showing an electrolytic machining process according to the present invention.
Figure 3:
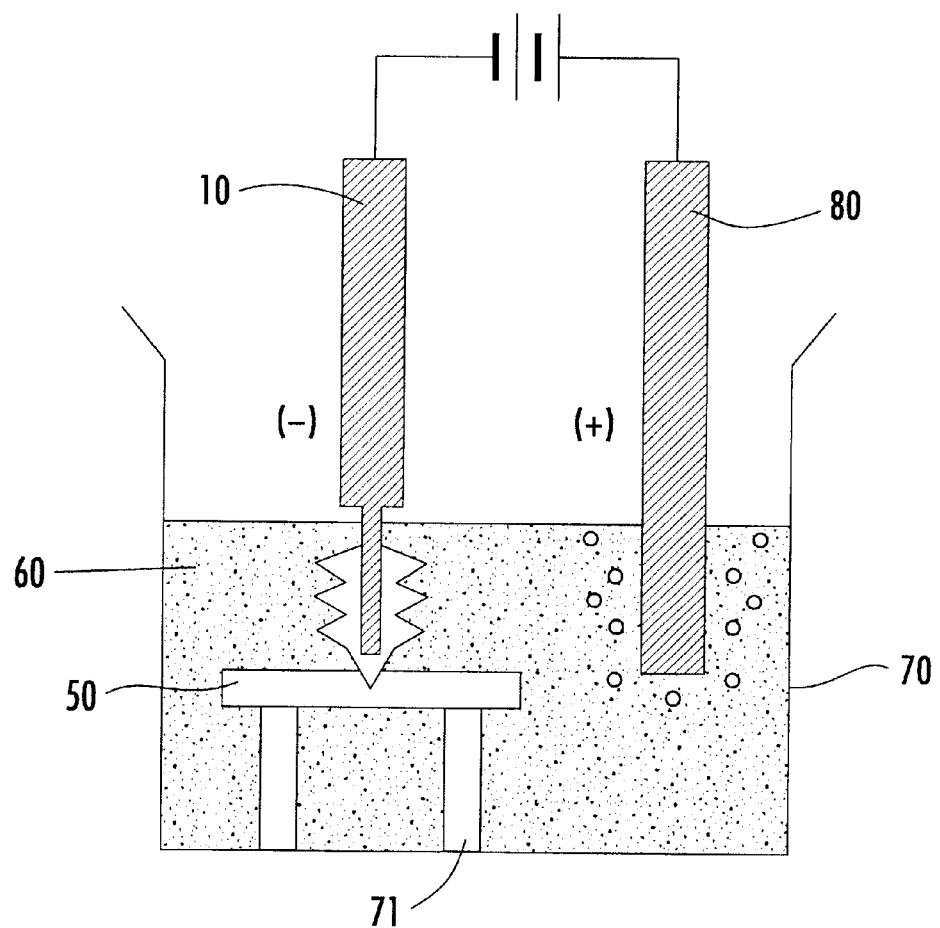
FIG. 3 is a schematic diagram showing an electrochemical discharge machining process according to the present invention.

Turning now to FIGS. 2 and 3, an electrolytic machining process according to the present invention and an electrochemical discharge machining process according to the present invention are shown, respectively. As will be seen in FIGS. 2 and 3, the present machining method allows the electrolytic machining process and the electrochemical discharge machining process to be carried out in the same machining device 200.

First, as illustrated in FIG. 2, the tool 10 serving as an anode and the electrode 80 serving as a cathode are immersed in the electrolyte 60. Then, when the predetermined direct current is applied thereto, a certain portion of the tool 10 is dissolved into the electrolyte 60 through the oxidation reaction, and the electrode 80 generates hydrogen gas through the reduction reaction. As such, if the applied current (i.e., current density) for the surface area of the tool 10 exposed to the electrolyte 60 (based upon the machining state of the tool 10) is held constant, the machined portion of the tool 10 has a uniform diameter. From a standpoint of a simple electrolytic machining, the tool 10 is a machining target in the machining of the tool 10.

Second, as illustrated in FIG. 3, the polarity of the tool 10 is converted from an anode to a cathode, and the electrode 80, which previously served as a cathode, is converted to an anode. Thereafter, if the predetermined voltage is applied thereto, a reduction reaction which generates hydrogen gas occurs at the tool 10 and an oxidation reaction occurs at the electrode 80.

When the applied voltage is increased, sparks travel from the lower end of the tool 10 to the upper portion. As such, spark emission is limited to occur only at the lower end of the tool 10 by controlling the voltage. Then, the tool 10 can be fed to the workpiece 50 to perform the electrochemical discharge machining.

In the electrochemical discharge machining device and the machining method, the tool 10 may be made of other pure metal materials other than tungsten or copper. Additionally, the electrode 80 may be made of other metal materials insoluble in aqueous alkaline solution other than platinum, gold or silver.

As described above, with the electrochemical discharge machining device and the machining method according to the present invention, an electrolytic machining process and an electrochemical discharge machining process can be carried out in the same machining device. Thus, the machining time required to perform the process can be decreased, and error ranges attributed to machining can be lessened. Therefore, machining and productivity of the workpiece can be improved by accurately machining the workpiece.

More particularly, by a relatively simple operation of the mode which provides power and concentration of the electrolytic solution, the electrolytic machining and the electrochemical discharge machining can be performed together, irrespective of hardness of the workpiece. In particular, materials having high brittleness, such as ceramics, glass, quartz, ruby, sapphire, and diamond, can be machined.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

That which is claimed is:

1. An electrochemical discharge machining device comprising:

a tool feeder and a position controller therefor;

a tool carried by said tool feeder;

an electrode;

a power controller for applying a current to said tool and said electrode and selectively switching a polarity of the current; and an electrolytic bath comprising an electrolyte in which a workpiece is to be processed, the electrolyte for promoting an electrochemical reaction between the tool and the electrode when immersed therein.

2. The device according to claim 1 wherein said electrolyte comprises an aqueous alkaline solution selected from the group consisting of potassium hydroxide, magnesium hydroxide, sodium hydroxide, and calcium hydroxide.

3. The device according to claim 1 wherein said tool comprises at least one of tungsten and copper.

4. The device according to claim 1 wherein said power controller applies a direct current to said tool and said electrode.

5. The device according to claim 1 wherein the workpiece comprises at least one of glass, ceramic, quartz, diamond, ruby, and sapphire.

6. The device according to claim 1 wherein said electrolytic bath further comprises an exhaust valve for removing the electrolyte from said electrolytic bath.

7. An electrochemical discharge machining device comprising:

an electrolytic bath comprising an electrolyte in which a workpiece is to be processed;

a tool and an electrode to be inserted in said electrolytic bath; and a power controller for selectively switching polarities of said tool and said electrode and applying power thereto to alternately perform electrolytic machining of said tool and electrochemical discharge machining of the workpiece.

8. The device according to claim 7 wherein said power controller switches the polarity of said tool to a positive polarity and switches the polarity of said electrode to a negative polarity to perform electrolytic machining.

9. The device according to claim 7 wherein said power controller switches the polarity of said tool to a negative polarity and switches the polarity of said electrode to a positive polarity to perform electrochemical discharge machining.

10. The device according to claim 7 wherein said power controller operates in a current controlled mode during electrolytic machining and in a voltage controlled during electrochemical discharge machining.

11. The device according to claim 7 further comprising a tool feeder for said tool and a position controller for said tool feeder.

12. The device according to claim 11 wherein said tool feeder comprises a three-dimensional tool feeder, and wherein said position controller electrically controls three axial direction movements of the three-dimensional tool feeder.

13. A method for performing electrochemical discharge machining of a workpiece comprising a material, the method comprising:

providing an electrolytic bath comprising an electrolyte and placing the workpiece therein;

inserting a tool and an electrode in the electrolytic bath; and selectively switching polarities of the tool and the electrode and applying power thereto to alternately perform electrolytic machining of the tool and electrochemical discharge machining of the workpiece.

14. The method according to claim 13 wherein selectively switching comprises switching the polarity of the tool to a positive polarity and switching the polarity of the electrode to a negative polarity to perform electrolytic machining.

15. The method according to claim 13 wherein selectively switching comprises switching the polarity of the tool to a negative polarity and switching the polarity of the electrode to a positive polarity to perform electrochemical discharge machining.

16. The method according to claim 13 wherein applying power comprises applying current during electrolytic machining and applying voltage during electrochemical discharge machining.

17. The method according to claim 13 wherein the electrolyte comprises an aqueous alkaline solution selected from the group consisting of potassium hydroxide, magnesium hydroxide, sodium hydroxide, and calcium hydroxide.

18. The method according to claim 13 wherein the tool comprises at least one of tungsten and copper.

19. The method according to claim 13 wherein the electrode comprises at latinum, silver and gold.

* * * * *

UNITED STATES PATENT AND TRADEMARK OFFICE
CERTIFICATE OF CORRECTION

PATENT NO. : 6,679,985 B2 Page 1 of 1
DATED : January 20, 2004
INVENTOR(S) : Soo Hyun Kim, Young-Mo Lim and Hyung-Jun Lim It is certified that error appears in the above-identified patent and that said Letters Patent is hereby corrected as shown below:

<u>Title page,</u>
Item item:
-- [73] Assignee: Korea Advanced Institute of Science and Technology --

Signed and Sealed this

Eighteenth Day of May, 2004

JON W. DUDAS
*Acting Director of the United States Patent and Trademark Office*